US010618436B2

(12) United States Patent
Madhu

(10) Patent No.: US 10,618,436 B2
(45) Date of Patent: Apr. 14, 2020

(54) SEATING ARRANGEMENT HAVING A RECLINABLE SEAT BACK

(71) Applicant: Lear Corporation, Southfield, MI (US)

(72) Inventor: Adarsha B. Madhu, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/129,872

(22) Filed: Sep. 13, 2018

(65) Prior Publication Data
US 2020/0086772 A1  Mar. 19, 2020

(51) Int. Cl.
| | |
|---|---|
| *B60N 2/30* | (2006.01) |
| *B60N 2/36* | (2006.01) |
| *B60N 2/22* | (2006.01) |
| *B60N 2/20* | (2006.01) |
| *B60N 2/90* | (2018.01) |

(52) U.S. Cl.
CPC ............. *B60N 2/366* (2013.01); *B60N 2/20* (2013.01); *B60N 2/2245* (2013.01); *B60N 2/3011* (2013.01); *B60N 2002/952* (2018.02); *B60N 2205/30* (2013.01)

(58) Field of Classification Search
CPC ........ B60N 2/366; B60N 2/20; B60N 2/2245; B60N 2/3011
USPC .................................................. 297/378.13
See application file for complete search history.

(56) References Cited

U.S. PATENT DOCUMENTS

| | | | | |
|---|---|---|---|---|
| 5,662,369 A * | 9/1997 | Tsuge | ..................... | B60N 2/366 297/378.13 X |
| 6,341,820 B1 * | 1/2002 | Kimura | .................... | B60N 2/20 297/378.13 X |
| 6,547,302 B1 * | 4/2003 | Rubio | .................... | B60N 2/366 297/378.13 X |
| 6,786,551 B2 * | 9/2004 | Brewer | .................. | B60N 2/366 297/378.13 X |
| 7,762,605 B2 * | 7/2010 | Otsuka | ............... | B60N 2/01583 297/378.13 X |
| 7,959,205 B2 * | 6/2011 | Paing | .................. | B60N 2/01583 296/65.03 |
| 8,439,446 B2 | 5/2013 | Ishii et al. | | |
| 8,544,931 B2 * | 10/2013 | Park | .................... | B60N 2/01583 297/378.13 X |
| 8,708,413 B2 * | 4/2014 | Heeg | .................. | B60N 2/01583 297/378.13 |
| 8,727,443 B2 * | 5/2014 | Vedder | ................... | B60N 2/366 297/378.13 X |
| 8,950,810 B2 * | 2/2015 | Dryburgh | ........... | B60N 2/01583 297/378.13 X |
| 9,050,911 B2 | 6/2015 | Wieclawski et al. | | |
| 9,381,831 B2 | 7/2016 | Mitsuhashi et al. | | |
| 9,616,779 B2 | 4/2017 | Barzen et al. | | |
| 2010/0052394 A1 * | 3/2010 | Heeg | ..................... | B60N 2/366 297/378.13 |

(Continued)

FOREIGN PATENT DOCUMENTS

| | | |
|---|---|---|
| DE | 10159533 A1 | 6/2003 |
| DE | 102004037289 A1 | 3/2006 |
| WO | 2008122418 A2 | 10/2008 |

*Primary Examiner* — Rodney B White
(74) *Attorney, Agent, or Firm* — Brooks Kushman PC

(57) ABSTRACT

A seating arrangement having a striker, a seat back, and a latch mechanism. The seat back may be pivotable about an axis of rotation. The latch mechanism may be disposed on the seat back. The latch mechanism may allow the seat back to be secured to the striker in multiple angular positions.

20 Claims, 9 Drawing Sheets

(56) References Cited

U.S. PATENT DOCUMENTS

| | | | |
|---|---|---|---|
| 2014/0306507 A1* | 10/2014 | Mueller | B60N 2/01583 297/463.1 |
| 2014/0348578 A1* | 11/2014 | Mueller | B60N 2/01583 403/322.4 |
| 2015/0061349 A1* | 3/2015 | Handl | B60N 2/366 297/463.1 |
| 2017/0015219 A1* | 1/2017 | Mosch | B60N 2/366 |

* cited by examiner

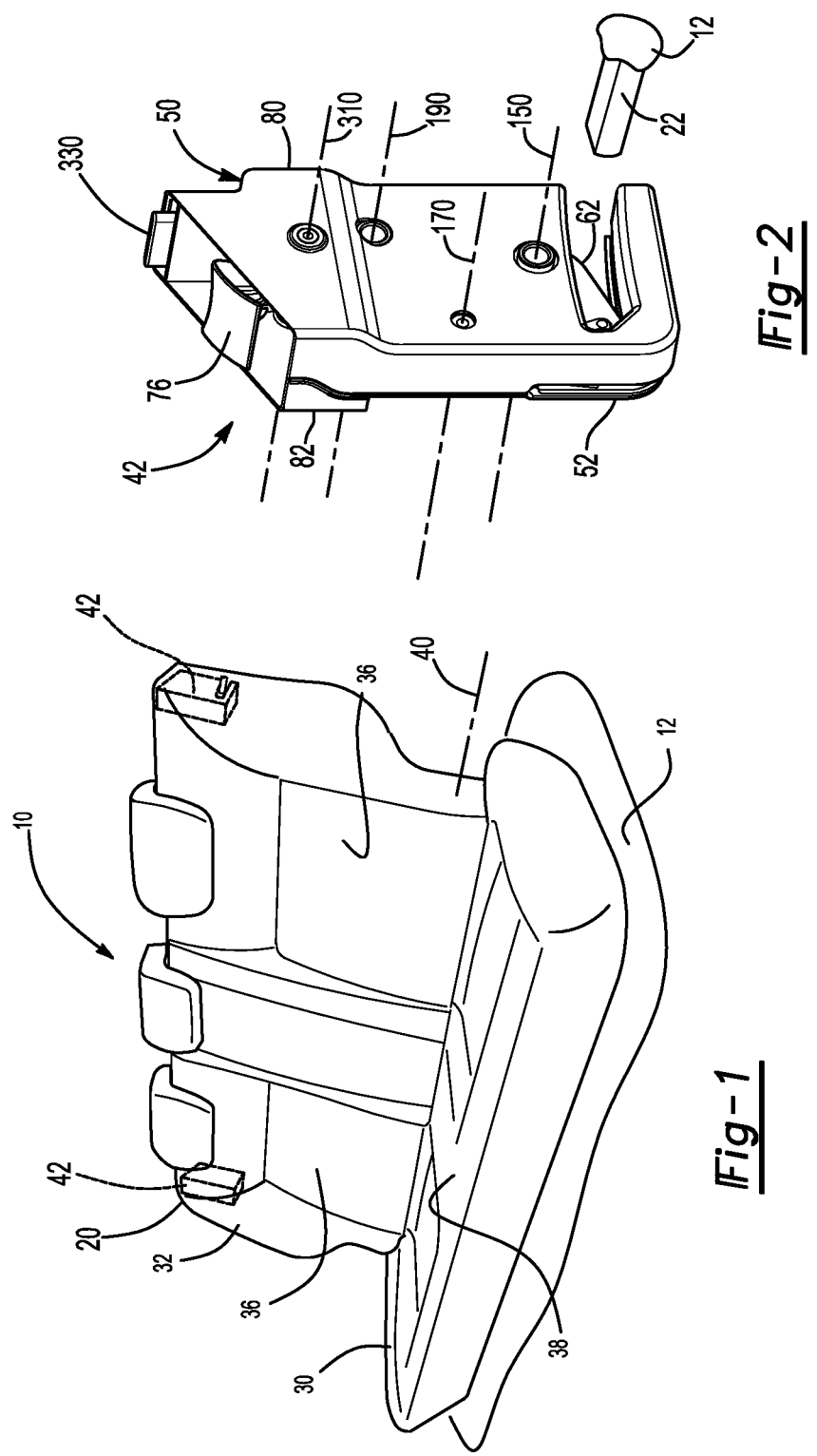

SEATING ARRANGEMENT HAVING A RECLINABLE SEAT BACK

TECHNICAL FIELD

This patent application relates to a seating arrangement having a latch mechanism that may allow a seat back to be reclined to multiple positions.

BACKGROUND

A latching system for a pivotable seat back is disclosed in U.S. Pat. No. 9,050,911.

SUMMARY

In at least one embodiment, a seat arrangement is provided. The seat arrangement may include a striker, a seat back, and a latch mechanism. The striker may be fixedly disposed on a vehicle. The seat back may be pivotable about an axis of rotation. The latch mechanism may be disposed on the seat back and may include a pawl and a cinch plate. The pawl may be rotatable about a first axis and may have a pawl slot. The cinch plate may be rotatable about the first axis with respect to the pawl and may be disposed adjacent to the pawl. The striker may be disposed between the pawl and the cinch plate when the striker is received in the pawl slot.

In at least one embodiment, a seat arrangement is provided. The seat arrangement may include a striker, a seat back, and a latch mechanism. The striker may be fixedly disposed on a vehicle. The seat back may be pivotable about an axis of rotation with respect to the striker. The latch mechanism may be disposed proximate a top of the seat back. The latch mechanism may include a pawl, a latch, and a locking cam. The pawl may be rotatable about a first axis. The pawl may have a set of pawl teeth and a pawl slot disposed opposite the set of pawl teeth. The latch may be rotatable about a second axis. The latch may have a first latch arm and a second latch arm. The first latch arm may extend away from the second axis. The second latch arm may also extend away from the second axis and may have an enlarged head and a recess. The enlarged head may be disposed at a distal end of the second latch arm and may have a set of latch teeth that may be engageable with the set of pawl teeth. The recess may extend from the enlarged head to the second latch arm. The locking cam may be rotatable about a third axis. The locking cam may engage the enlarged head to hold the set of latch teeth in meshing engagement with the set of pawl teeth to inhibit rotation of the pawl and the latch.

In at least one embodiment, a seat arrangement is provided. The seat arrangement may include a striker, a seat back, and a latch mechanism. The striker may be fixedly disposed on a vehicle. The seat back may be pivotable about an axis of rotation with respect to the striker. The latch mechanism may be disposed proximate a top of the seat back. The latch mechanism may include a first mounting plate, a second mounting plate, a housing, a pawl, and a latch. The first mounting plate may have a mounting plate slot having a closed end. The housing may be fixedly positioned with respect to the first mounting plate and the second mounting plate. The housing may have a housing slot that may be aligned with the mounting plate slot. The housing slot may have a closed end. The pawl may be rotatably mounted between the first mounting plate and the second mounting plate. The pawl may have a set of pawl teeth and a pawl slot. The latch may be rotatably mounted between the first mounting plate and the second mounting plate. The latch may have a set of latch teeth that may be engageable with the set of pawl teeth to inhibit rotation of the pawl. The latch mechanism may allow the seat back to be secured to the striker in multiple angular positions when the striker is received in the mounting plate slot, the housing slot, and the pawl slot.

BRIEF DESCRIPTION OF THE DRAWINGS

FIG. 1 is a perspective view of an example of a seating arrangement having a seat back and at least one latch mechanism.

FIG. 2 is a perspective view of a latch mechanism.

DETAILED DESCRIPTION

Figure 3:
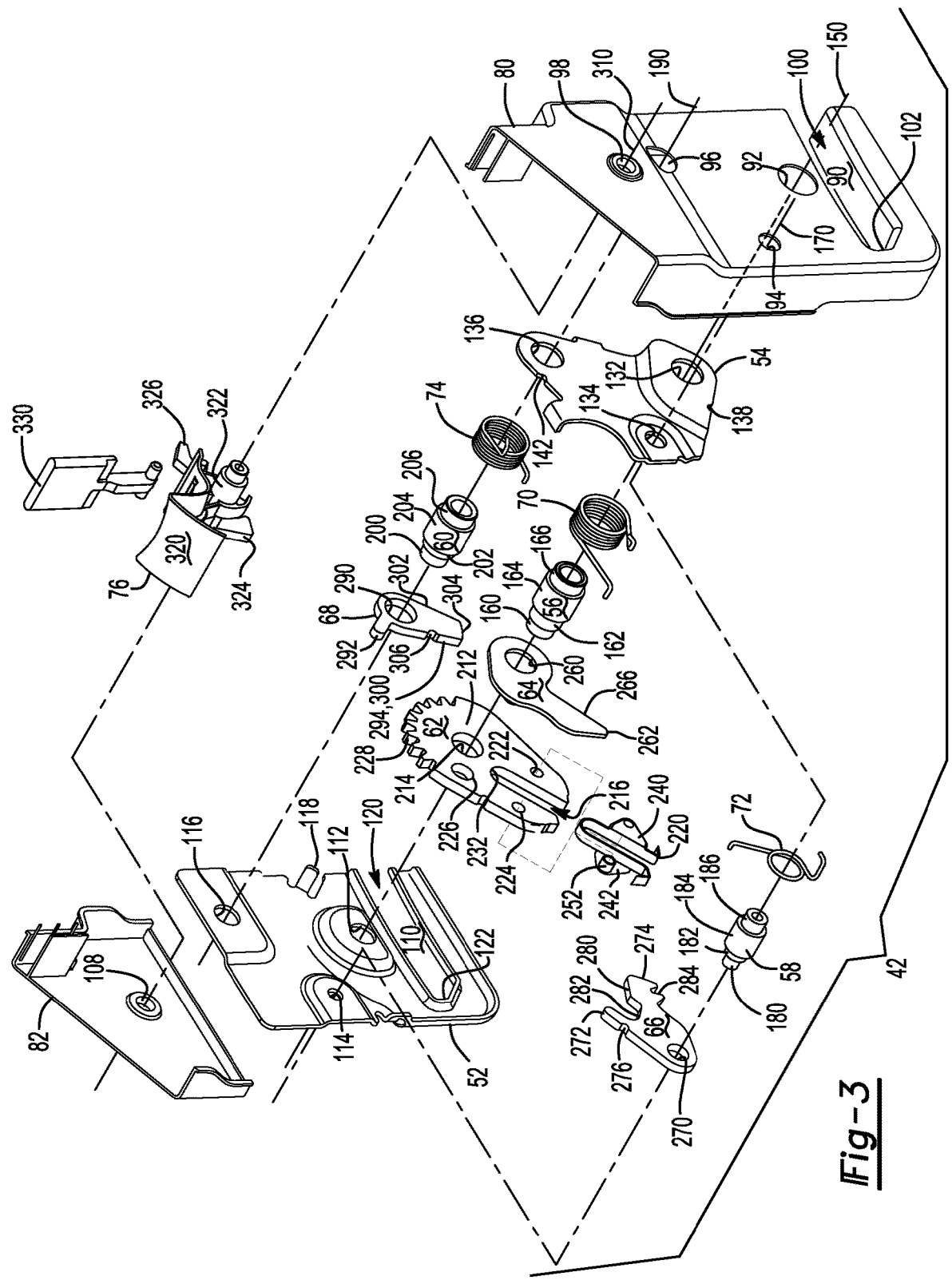
FIGS. 3 and 4 are exploded views of the latch mechanism.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIG. 1, an example of a seat arrangement 10 is shown. The seat arrangement 10 may be provided with a vehicle 12, such as a motor vehicle like a car or truck. In at least one configuration, the seat arrangement 10 may include a seat assembly 20 and a striker 22, which is shown in FIG. 2.

The seat assembly 20 may be configured as a rear seat that may be positioned behind a front seating row or front seat that may be occupied by a vehicle driver. The seat assembly 20 may include a seat bottom 30 and a seat back 32.

The seat bottom 30 may be configured to be mounted on a mounting surface, such as a vehicle body structure like a floor pan of the vehicle 12. The seat bottom 30 may be configured to support a seat occupant. The seat bottom 30 may include a trim cover and a cushion. The trim cover may form an exterior surface of at least a portion of the seat bottom 30 and may be disposed on the cushion. The cushion may be disposed on a body structure of the vehicle 12 or a frame or support that may be disposed on the vehicle body structure.

The seat bottom 30 and the seat back 32 may cooperate to provide one or more seating positions. For instance, the seat bottom 30 and seat back 32 may cooperate to define one or more primary seating positions 36 and a secondary seating position 38. The secondary seating position 38 may be disposed between two primary seating positions 36 and may be located near or at the center of the seat assembly 20.

Optionally, a foldable armrest may be provided in the seat back 32 at the secondary seating position 38.

The seat back 32 may be disposed proximate the seat bottom 30 and may be configured to support the back of a seat occupant. The seat back 32 or a portion thereof may be configured to pivot or rotate about an axis of rotation 40 with respect to the striker 22 and the seat bottom 30. In at least one configuration, the seat back 32 may include a seat back frame, a cushion, a trim cover, and a latch mechanism 42.

The seat back frame may be configured to be mounted to the vehicle. For example, the seat back frame may be pivotally mounted to the vehicle body structure, the seat bottom 30 or both. The seat back frame may have multiple seat back portions that may be configured to pivot or rotate forward from a generally upright seating position shown in FIG. 1 to a folded position in which at least a portion of the seat back 32 and seat back frame may be folded over the seat bottom 30 and may engage the seat bottom 30. In addition, the seat back portions may be configured to pivot or rotate rearward from the generally upright seating position shown in FIG. 1 to one or more distinct reclined positions as will be discussed in more detail below. The seat back frame may or may not have a split construction or a split configuration in which the seat back 32 is divided into multiple portions that may be independently pivotable or rotatable about the axis of rotation 40.

The cushion may be configured to help support a seat occupant. The cushion may be disposed on the seat back frame and may be made of any suitable material. For example, the cushion may be made of a molded polymeric material such as open cell foam or closed cell foam.

The trim cover may form an exterior surface of at least a portion of the seat back 32. The trim cover may be disposed on the cushion and may at least partially cover or conceal the cushion. For example, the trim cover may extend across a front side of the cushion that may be configured to face toward and support a seat occupant. In addition, the trim cover may extend across a top side and opposing lateral sides of the cushion. The trim cover may be made of any suitable material, such as fabric, vinyl, leather, or combinations thereof. The trim cover may be mounted on the seat back 32 in any suitable manner. For example, the trim cover may be secured with one or more attachment features, such as a hook, clip, ring, hook and loop fastener, drawstring or the like.

Referring to FIG. 2, an example of the latch mechanism 42 is shown. The latch mechanism 42 may selectively engage the striker 22 to secure the seat back 32 or a portion of the seat back 32 at a desired angular position and inhibit the seat back 32 or a portion of the seat back 32 from rotating about the axis of rotation 40. For example, the seat back 32 or a portion thereof may not rotate about the axis of rotation 40 when the latch mechanism 42 receives and grasps the striker 22 but may be free to pivot about the axis of rotation 40 with respect to the striker 22 when the latch mechanism 42 is in an unlocked position and does not grasp the striker 22.

The latch mechanism 42 may be disposed on the seat back 32 and may be disposed proximate the top of the seat back 32. In addition, the latch mechanism 42 may be disposed at or adjacent to an outboard lateral side of the seat back 32 that may face toward the striker 22. In at least one configuration, the latch mechanism 42 may not include an ejector mechanism or pretensioned spring that may abut and eject the striker 22 from the latch mechanism 42.

Figure 4:
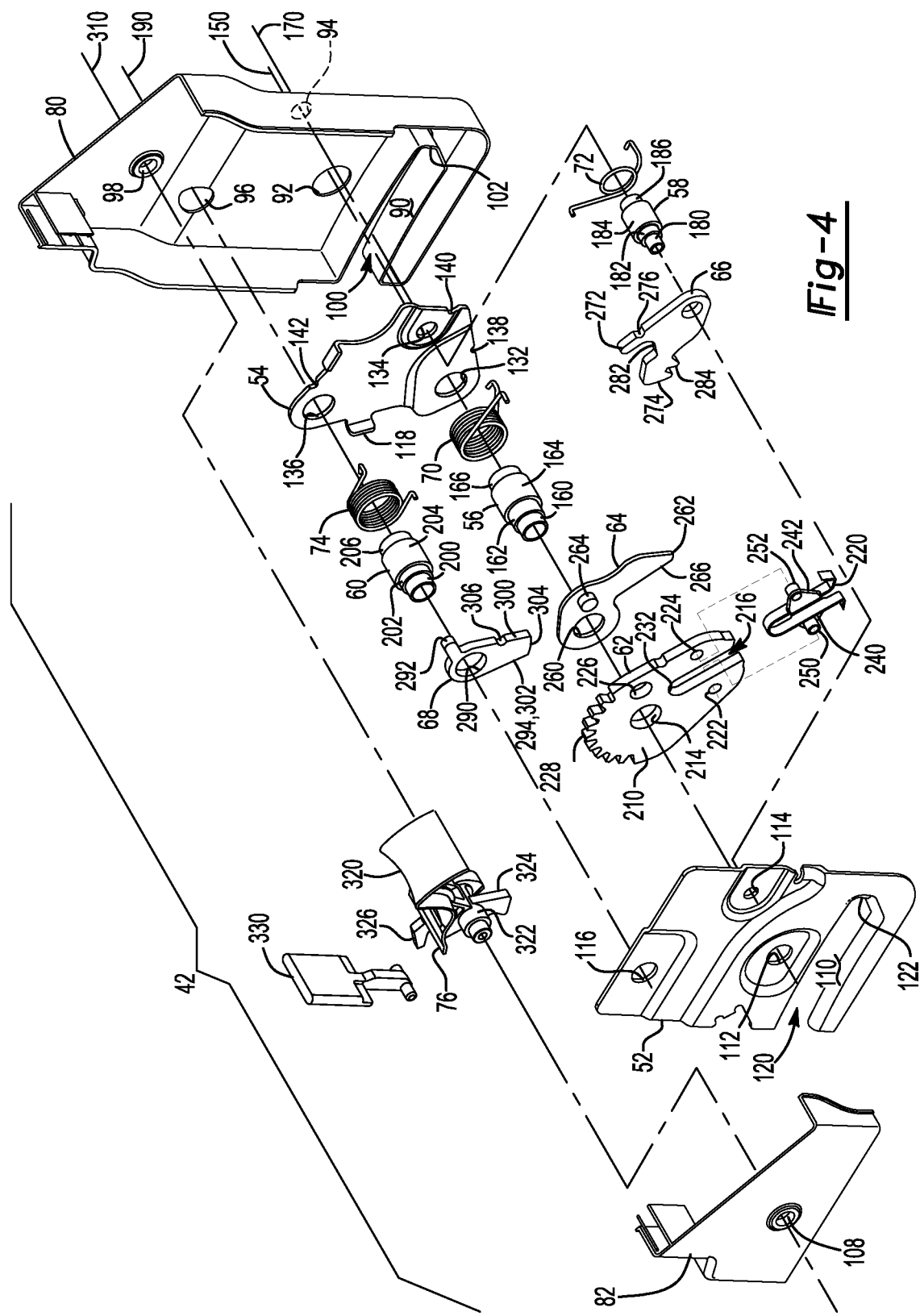

Referring to FIGS. 2-4, the latch mechanism 42 is shown in more detail. In at least one embodiment, the latch mechanism 42 may include a housing 50, a first mounting plate 52, a second mounting plate 54, a first pin 56, a second pin 58, a third pin 60, a pawl 62, a cinch plate 64, a latch 66, a locking cam 68, a first biasing member 70, a second biasing member 72, a third biasing member 74, and a release handle 76.

Referring to FIG. 2, the housing 50 may receive components of the latch mechanism 42. In addition, the housing 50 may provide a desired aesthetic appearance. The housing 50 may be made of any suitable material, such as a polymeric material like plastic and may have a one piece or a multi-piece configuration. In the configuration shown, the housing 50 may include a first housing portion 80 and a second housing portion 82.

Referring to FIGS. 3 and 4, the first housing portion 80 may generally be disposed opposite the first mounting plate 52. The first housing portion 80 may define one or more exterior sides of the latch mechanism 42. In at least one configuration, the first housing portion 80 may include a housing slot 90, a first housing hole 92, a second housing hole 94, a third housing hole 96, and a fourth housing hole 98.

The housing slot 90 may be configured to receive the striker 22. In at least one configuration, the housing slot 90 may be an open-ended slot that may include an open end 100 and a closed end 102.

The open end 100 may be disposed opposite the front side of the seat back 32. The open end 100 may permit the striker 22 to enter and exit the housing slot 90 depending on the rotational position of the seat back 32 and state of the latch mechanism 42.

The closed end 102 may be disposed opposite the open end 100. As such, the closed end 102 may be disposed closer to the front side of the seat back 32 than the open end 100.

The first housing hole 92 may be disposed above the housing slot 90. The first housing hole 92 may receive the first pin 56.

The second housing hole 94 may be disposed above the first housing hole 92 and may generally be disposed above the closed end 102 of the housing slot 90. As such, the second housing hole 94 may be disposed closer to the front of the seat back 32 than the first housing hole 92. The second housing hole 94 may receive the second pin 58.

The third housing hole 96 may be disposed above the second housing hole 94 and may be disposed rearward or further from the front of the seat back 32 than the first housing hole 92 and the second housing hole 94. The third housing hole 96 may receive the third pin 60.

The fourth housing hole 98 may be disposed above the third housing hole 96 and may be generally located directly above the first housing hole 92. The fourth housing hole 98 may receive or rotatably support the release handle 76.

The second housing portion 82 may be disposed opposite the first housing portion 80. In addition, the second housing portion 82 may be generally located above the first mounting plate 52. The second housing portion 82 may cooperate with the first housing portion 80 to define an opening that may receive the release handle 76. The opening may be located at the top of the seat back 32 to provide easy access to the release handle 76. The second housing portion 82 may be secured to the first housing portion 80 in any suitable manner, such as with one or more fasteners, snap tabs, or the like. The second housing portion 82 may include a second housing portion hole 108 that may receive or rotatably support the release handle 76. The second housing portion hole 108 may be coaxially disposed with the fourth housing hole 98.

The first mounting plate 52 may be fixedly disposed on the seat back 32 or fixedly positioned with respect to the seat back 32. For example, the first mounting plate 52 may be disposed on a frame of the seat back 32. The first mounting plate 52 may be made of any suitable material, such as metal. The first mounting plate 52 may be attached to the seat back 32 in any suitable manner, such as by welding or with one or more fasteners. In addition, the first mounting plate 52 may be fixedly positioned with respect to the housing 50. The first mounting plate 52 may be disposed below the second housing portion 82 and may be fixedly positioned with respect to the housing 50. In at least one configuration, the first mounting plate 52 may include a mounting plate slot 110, a first mounting plate hole 112, a second mounting plate hole 114, a third mounting plate hole 116, and a pawl stop 118.

The mounting plate slot 110 may have substantially the same configuration as the housing slot 90 and may be aligned with the housing slot 90. As such, the mounting plate slot 110 may be configured to receive the striker 22 and may be an open-ended slot that may include an open end 120 and a closed end 122.

The open end 120 may be disposed opposite the front side of the seat back 32. The open end 120 may permit the striker 22 to enter and exit the housing slot 90 depending on the rotational position of the seat back 32.

The closed end 122 may be disposed opposite the open end 120. As such, the closed end 122 may be disposed closer to the front side of the seat back 32 than the open end 120.

The first mounting plate hole 112 may be disposed above the mounting plate slot 110. The first mounting plate hole 112 may be coaxially disposed with the first housing hole 92 and may receive the first pin 56.

The second mounting plate hole 114 may be disposed above the first mounting plate hole 112 and may generally be disposed above the closed end 122 of the mounting plate slot 110. The second mounting plate hole 114 may be coaxially disposed with the second housing hole 94 and may receive the second pin 58.

The third mounting plate hole 116 may be disposed above the second mounting plate hole 114. The third mounting plate hole 116 may be coaxially disposed with the third housing hole 96 and may receive the third pin 60.

The pawl stop 118 may engage the pawl 62 to limit rotational movement of the pawl 62. For example, the pawl stop 118 may limit rotation of the pawl 62 such that a pawl slot of the pawl 62 may rotate to the open end 120 of the mounting plate slot 110. The pawl stop 118 may have any suitable configuration. For example, the pawl stop 118 may be a tab or a protrusion that may extend toward the second mounting plate 54.

Referring to FIGS. 3 and 4, the second mounting plate 54 may be disposed opposite the first mounting plate 52 and may be spaced apart from the first mounting plate 52. As such, the second mounting plate 54 may be disposed proximate and may engage the first housing portion 80. The second mounting plate 54 may be fixedly positioned with respect to the first mounting plate 52. As such, the second mounting plate 54 may not move with respect to the seat back 32. The second mounting plate 54 may be made of any suitable material, such as metal. The second mounting plate 54 may be positioned above the housing slot 90 and may generally be positioned below the second housing portion 82 in one or more configurations. In at least one configuration, the second mounting plate 54 may include a first mounting plate hole 132, a second mounting plate hole 134, and a third mounting plate hole 136, a first notch 138, a second notch 140, and the third notch 142.

The first mounting plate hole 132 may be coaxially disposed with the first housing hole 92 and the first mounting plate hole 112 of the first mounting plate 52. The first mounting plate hole 132 may receive the first pin 56.

The second mounting plate hole 134 may be coaxially disposed with the second housing hole 94 and the second mounting plate hole 114 of the first mounting plate 52. The second mounting plate hole 134 may receive the second pin 58.

The third mounting plate hole 136 may be coaxially disposed with the third housing hole 96 and the third mounting plate hole 116 of the first mounting plate 52. The third mounting plate hole 136 may receive the third pin 60.

The first notch 138 may facilitate mounting of the first biasing member 70. The first notch 138 may have any suitable configuration. For example, the first notch 138 may be configured as a hole or recess that may receive a portion of the first biasing member 70.

The second notch 140 may facilitate mounting of the second biasing member 72. The second notch 140 may be disposed above the first notch 138 and may also have any suitable configuration.

The third notch 142 may facilitate mounting of the third biasing member 74. The third notch 142 may be disposed above the second notch 140 and may also have any suitable configuration.

The first pin 56 may extend from the first mounting plate 52 to the second mounting plate 54. In addition, the first pin 56 may extend through the second mounting plate 54 to the first housing portion 80. The first pin 56 may be disposed along or around a first axis 150. In at least one configuration, the first pin 56 may be provided with a stepped configuration having multiple diameters that may be coaxially disposed or centered about the first axis 150. For instance, the first pin 56 may have a first portion 160, a second portion 162, a third portion 164, and a fourth portion 166, which are best shown in FIG. 4.

The first portion 160 may be received in the first mounting plate hole 112 of the first mounting plate 52. The first portion 160 may be fastened to the first mounting plate 52 in any suitable manner, such as with an interference fit.

The second portion 162 may be positioned along the first axis 150 between the first portion 160 and the third portion 164. The second portion 162 may have a larger diameter than the first portion 160. The second portion 162 may have a side surface that may extend from the outside diameter of first portion 160 that may engage the first mounting plate 52 to inhibit axial movement. The second portion 162 may be received in and may rotatably support the pawl 62 and the cinch plate 64.

The third portion 164 may be positioned along the first axis 150 between the second portion 162 and the fourth portion 166. The third portion 164 may have a larger diameter than the second portion 162. The third portion 164 may have a first side surface that may extend from the outside diameter of the second portion 162 and a second side surface disposed opposite the first side that may extend to the outside diameter of the fourth portion 166. The first side may engage the pawl 62 or the cinch plate 64 to inhibit axial movement. The second side may engage the second mounting plate 54 to inhibit axial movement. The third portion 164 may be received in the first biasing member 70.

The fourth portion 166 may be disposed opposite the first portion 160 and may extend from the third portion 164. The fourth portion 166 may have a smaller diameter than the third portion 164. Optionally, the fourth portion 166 may have a different diameter than the first portion 160 to facilitate proper assembly of the latch mechanism 42. The fourth portion 166 may be received in the second mounting plate 54. The fourth portion 166 may be fastened to the second mounting plate in any suitable manner, such as with an interference fit.

The second pin 58 may have a similar configuration to the first pin 56. Like the first pin 56, the second pin 58 may extend from the first mounting plate 52 to the second mounting plate 54. In addition, the second pin 58 may extend through the second mounting plate 54 to the first housing portion 80. The second pin 58 may be disposed along or around a second axis 170. The second axis 170 may be disposed above the first axis 150 and may be disposed substantially parallel to the first axis 150. In at least one configuration, the second pin 58 may be provided with a stepped configuration having multiple diameters that may be coaxially disposed or centered about the second axis 170. For instance, the second pin 58 may have a first portion 180, a second portion 182, a third portion 184, and a fourth portion 186.

The first portion 180 may be received in the second mounting plate hole 114 of the first mounting plate 52. Optionally, the first portion 180 may have a different diameter than the first portion 160 of the first pin 56 to facilitate proper assembly of the latch mechanism 42. The first portion 180 may be fastened to the first mounting plate 52 in any suitable manner, such as with an interference fit.

The second portion 182 may be positioned along the second axis 170 between the first portion 180 and the third portion 184. The second portion 182 may have a larger diameter than the first portion 180. The second portion 182 may have a side surface that may extend from the outside diameter of first portion 180 that may engage the first mounting plate 52 to inhibit axial movement. The second portion 182 may be received in and may rotatably support the latch 66.

The third portion 184 may be positioned along the second axis 170 between the second portion 182 and the fourth portion 186. The third portion 184 may have a larger diameter than the second portion 182. The third portion 184 may have a first side surface that may extend from the outside diameter of the second portion 182 and a second side surface disposed opposite the first side that may extend from an outside diameter of the fourth portion 186. The first side may engage the latch 66 to inhibit axial movement. The second side may engage the second mounting plate 54 to inhibit axial movement. The third portion 184 may be received in the second biasing member 72.

The fourth portion 186 may be disposed opposite the first portion 180 and may extend from the third portion 184. The fourth portion 186 may have a smaller diameter than the third portion 184. Optionally, the fourth portion 186 may have a different diameter than the first portion 180 and/or the fourth portion 166 of the first pin 56 to facilitate proper assembly of the latch mechanism 42. The fourth portion 186 may be received in the second mounting plate 54. The fourth portion 186 may be fastened to the second mounting plate 54 in any suitable manner, such as with an interference fit.

The third pin 60 may have a similar configuration to the first pin 56. Like the first pin 56, the third pin 60 may extend from the first mounting plate 52 to the second mounting plate 54. In addition, the third pin 60 may extend through the second mounting plate 54 to the first housing portion 80. The third pin 60 may be disposed along or around a third axis 190. The third axis 190 may be disposed above the second axis 170 and may be disposed substantially parallel to the second axis 170. In at least one configuration, the third pin 60 may be provided with a stepped configuration having multiple diameters that may be coaxially disposed or centered about the third axis 190. For instance, the third pin 60 may have a first portion 200, a second portion 202, a third portion 204, and a fourth portion 206.

The first portion 200 may be received in the third mounting plate hole 116 of the first mounting plate 52. Optionally, the first portion 200 may have a different diameter than the first portion 160 of the first pin 56 and/or the first portion 180 of the second pin 58 to facilitate proper assembly of the latch mechanism 42. The first portion 200 may be fastened to the first mounting plate 52 in any suitable manner, such as with an interference fit.

The second portion 202 may be positioned along the third axis 190 between the first portion 200 and the third portion 204. The second portion 202 may have a larger diameter than the first portion 200. The second portion 202 may have a side surface that may extend from the outside diameter of first portion 200 that may engage the first mounting plate 52 to inhibit axial movement. The second portion 202 may be received in and may rotatably support the locking cam 68.

The third portion 204 may be positioned along the third axis 190 between the second portion 202 and the fourth portion 206. The third portion 204 may have a larger diameter than the second portion 202. The third portion 204 may have a first side surface that may extend from the outside diameter of the second portion 202 and a second side surface disposed opposite the first side that may extend from the outside diameter of the fourth portion 206. The first side may engage the locking cam 68 to inhibit axial movement. The second side may engage the second mounting plate 54 to inhibit axial movement. The third portion 204 may be received in the third biasing member 74.

The fourth portion 206 may be disposed opposite the first portion 200 and may extend from the third portion 204. The fourth portion 206 may have a smaller diameter than the third portion 204. Optionally, the fourth portion 206 may have a different diameter than the first portion 160 of the first pin 56, the first portion 180 of the second pin 58, the fourth portion 166 of the first pin 56, the fourth portion 186 of the second pin 58, or combinations thereof to facilitate proper assembly of the latch mechanism 42. The fourth portion 206 may be received in the second mounting plate 54. The fourth portion 206 may be fastened to the second mounting plate 54 in any suitable manner, such as with an interference fit.

Figure 5:
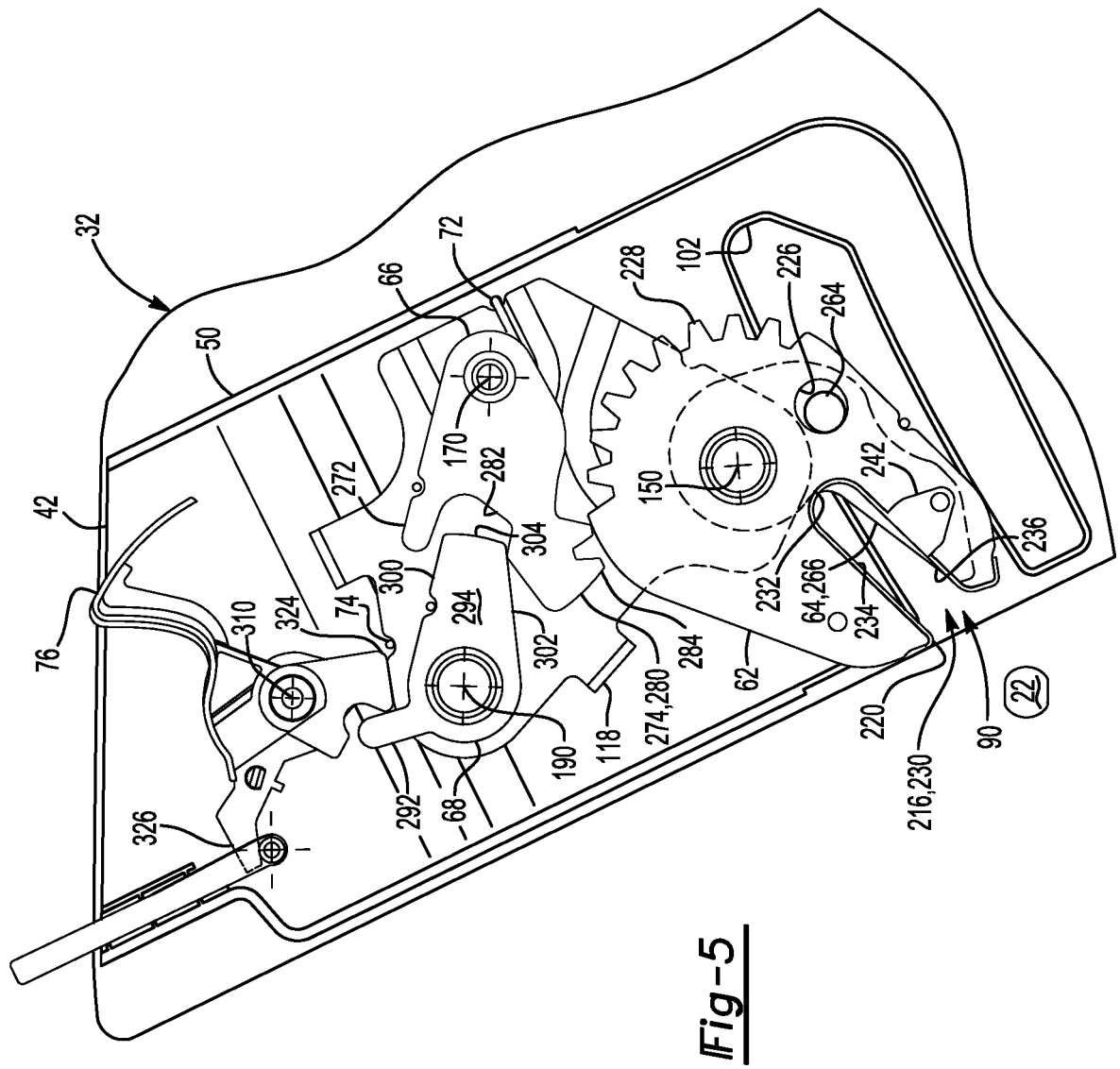
FIG. 5 is a side view of a portion of the latch mechanism prior to receiving a striker.

Referring to FIGS. 3-5, the pawl 62 may be rotatable about the first axis 150. For example, the pawl 62 may be configured to rotate between an open condition and a closed condition. The pawl may not secure the striker 22 when in the open condition and may secure the striker 22 when in the closed condition. The pawl 62 be rotatably disposed on the first pin 56 between the first mounting plate 52 and the second mounting plate 54. For instance, the pawl 62 may be rotatably disposed on the second portion 162 of the first pin 56 and may be axially positioned between the first mounting plate 52 and the third portion 164 of the first pin 56. In at least one configuration, the pawl 62 may include a first side 210, a second side 212, a hole 214, a pawl slot 216, a reinforcement insert 220, a first flange pin receiving hole 222, a second flange pin receiving hole 224, a cinch pin receiving hole 226, and a set of pawl teeth 228.

The first side 210 may face toward the first mounting plate 52 as is best shown in FIG. 4.

The second side 212 may be disposed opposite the first side 210. As such, the second side 212 may face toward the second mounting plate 54 as is best shown in FIG. 3.

The hole 214 may be a through hole that may be disposed along the first axis 150 and that may extend from the first side 210 to the second side 212. The hole 214 may receive the first pin 56.

The pawl slot 216 may be configured to receive the striker 22. The pawl slot 216 may extend from the first side 210 to the second side 212. In addition, the pawl slot 216 may be disposed opposite the set of pawl teeth 228. In at least one configuration, the pawl slot 216 may be offset from the first axis 150 and may be positioned such that a center axis of the pawl slot 216 may not be disposed along a radius that extends from the first axis 150. The pawl slot 216 may have a U-shaped configuration that may extend from a perimeter or exterior side of the pawl 62 that may extend from the first side 210 to the second side 212. As such, the pawl slot 216 may be an open-ended slot that may include an open end 230 and a closed end 232 and may be at least partially defined by a first lateral side 234 and a second lateral side 236, which are best shown in FIG. 5.

The open end 230 may permit the striker 22 to enter and exit the pawl slot 216 depending on the rotational position of the pawl 62.

The closed end 232 may be disposed opposite the open end 230. The closed end 232 may be disposed closer to the first axis 150 than the open end 230.

The first lateral side 234 may extend from the open end 230. The first lateral side 234 may be positioned closer to the first axis 150 than the second lateral side 236. In addition, the first lateral side 234 may be substantially linear or planar in one or more configurations.

The second lateral side 236 may be disposed opposite the first lateral side 234. The second lateral side may extend from the open end 230 and may be disposed closer to the cinch pin receiving hole 226 than the first lateral side 234 and may be disposed adjacent to the cinch plate 64. The second lateral side 236 may be disposed substantially parallel to the first lateral side 234.

The reinforcement insert 220, if provided, may be received in the pawl slot 216. The reinforcement insert 220 may help accommodate design tolerances of the pawl slot and may help secure the striker 22. In at least one configuration, the reinforcement insert 220 may be made of a more resilient material than the pawl 62 to help prevent vibration or rattling of the striker 22. The reinforcement insert 220 may have a U-shaped configuration that may extend the entire length of the pawl slot 216. For example, the reinforcement insert 220 may extend continuously from the closed end 232 along the first lateral side 234 and the second lateral side 236. Distal ends of the reinforcement insert 220 may extend outwardly from the open end 230 and hook onto the perimeter of the pawl 62. The reinforcement insert 220 may be a separate component from the pawl 62, however, reference to the striker 22 engaging or contacting the pawl 62 herein is to be interpreted as being synonymous with the striker 22 engaging or contacting the reinforcement insert 220 unless otherwise specified. The reinforcement insert 220 may also include a first flange 240 and a second flange 242, which are best shown in FIGS. 3 and 4.

The first flange 240 may be disposed on the first side 210 or the second side 212 of the pawl 62. The first flange 240 may include a first flange pin 250. The first flange pin 250 may extend from the first flange 240 into the first flange pin receiving hole 222 the pawl 62.

The second flange 242 may be disposed on a side of the pawl 62 that is disposed opposite the first flange 240. For example, the second flange 242 may be disposed on the first side 210 of the pawl 62 if the first flange 240 is disposed on the second side 212 of the pawl 62 or vice versa. The second flange 242 may have a second flange pin 252. The second flange pin 252 may extend from the second flange 242 into the second flange pin receiving hole 224 of the pawl 62.

The first flange pin receiving hole 222 may receive the first flange pin 250 to help secure the reinforcement insert 220. The first flange pin receiving hole 222 may be disposed between the first lateral side 234 and the perimeter of the pawl 62. As such, the first lateral side 234 may be disposed between the pawl slot 216 and the first flange pin receiving hole 222. In at least one configuration, the first flange pin receiving hole 222 may extend from the second side 212 toward the first side 210. The first flange pin receiving hole 222 may be a blind hole or may be a through hole that may extend to the first side 210.

The second flange pin receiving hole 224 may receive the second flange pin 252 to help secure the reinforcement insert 220. The second flange pin receiving hole 224 may be disposed between the second lateral side 236 and the perimeter of the pawl 62. As such the second lateral side 236 may be disposed between the pawl slot 216 and the second flange pin receiving hole 224. In at least one configuration, the second flange pin receiving hole 224 may extend from the first side 210 toward the second side 212. The second flange pin receiving hole 224 may be a blind hole or may be a through hole that may extend to the second side 212.

The cinch pin receiving hole 226 may receive a cinch pin of the cinch plate 64 as will be discussed in more detail below. The cinch pin receiving hole 226 may extend between the second side 212 and the first side 210. The cinch pin receiving hole 226 may be a blind hole or may be a through hole.

The set of pawl teeth 228 may be arranged around a portion of the perimeter of the pawl 62. For example, the pawl teeth 228 may be arranged along an arc and may be radially disposed with respect to the first axis 150. As an example, length of the arc over which the pawl teeth 228 may be arranged may be between 100-180°; however, this range may be larger or smaller depending on the range of movement desired for the seat back 32. As depicted, eight pawl teeth 228 are shown; however, it is contemplated that a greater or lesser number of pawl teeth 228 may be provided to increase or decrease the number of rotational positions at which the pawl 62 may be secured. The pawl teeth 228 may be selectively engaged by teeth of the latch 66 as will be discussed in more detail below.

Referring to FIGS. 3-5, the cinch plate 64 may be rotatable about the first axis 150 with respect to the pawl 62. The cinch plate 64 may be rotatably disposed on the first pin 56 between the first mounting plate 52 and the second mounting plate 54. For instance, the cinch plate 64 may be rotatably disposed on the second portion 162 of the first pin 56 and may be axially positioned between the pawl 62 and the third portion 164 of the first pin 56. It is also contemplated that the cinch plate 64 may be positioned on the opposite side of the pawl 62 such that the cinch plate 64 is disposed between the first mounting plate 52 and the pawl 62. The cinch plate 64 may be disposed adjacent to the pawl 62 and may generally be disposed parallel to the pawl 62. The cinch plate 64 may not be coplanar with the latch 66 in one or more configurations. In at least one configuration, the cinch plate 64 may include a hole 260, an elongated arm 262, and a cinch pin 264.

The hole 260 may be a through hole that may be disposed along the first axis 150. The hole 260 may receive the first pin 56.

The elongated arm 262 may be offset from the hole 260 and may partially overlap the pawl slot 216. For instance, the elongated arm 262 may have a length that may be the same as or slightly less than the length of the pawl slot 216. The elongated arm 262 may partially overlap the pawl slot 216 to accommodate the design tolerances of the striker 22 and help secure the striker 22 in the pawl slot 216 to reduce rattling and noise. For instance, the elongated arm 262 may have an inboard side 266 that may be substantially linear and may be disposed in a nonparallel relationship with the second lateral side 236 of the pawl slot 216 when viewed along the first axis 150 or from the perspective shown in FIG. 5. As such, the elongated arm 262 may overlap a greater amount of the pawl slot 216 in a direction that extends from the open end 230 of the pawl slot 216 to the closed end 232 of the pawl slot 216. Accordingly, the striker 22 may be disposed between the pawl 62 and the cinch plate 64 when the striker 22 is received in the pawl slot 216. For instance, the pawl 62 and the cinch plate 64 may both contact the striker 22 when the striker 22 is received in the pawl slot 216. More specifically, the striker 22 may engage the first lateral side 234 of the pawl slot 216 and the inboard side 266 of the cinch plate 64 when the striker 22 is secured in the pawl slot 216. The striker 22 may or may not engage the second lateral side 236 of the pawl slot 216.

The cinch pin 264 may extend from the cinch plate 64 toward the pawl 62. For example, the cinch pin 264 may extend from the elongated arm 262 and may be received in the cinch pin receiving hole 226 of the pawl 62. The cinch pin receiving hole 226 may be larger than the cinch pin 264. As such, the cinch pin receiving hole 226 may permit limited rotation of the cinch plate 64 about the first axis 150 with respect to the pawl 62. More specifically, the cinch pin receiving hole 226 may be slightly larger than the cinch pin 264 to permit some rotation of the cinch plate 64 with respect to the pawl 62 and may be sized to stop rotation of the cinch plate 64 about the first axis 150 when the cinch pin 264 engages or contacts the pawl 62 in the cinch pin receiving hole 226 or a surface of the pawl 62 that defines the cinch pin receiving hole 226. A spring or other biasing member may also be provided to urge the cinch plate 64 toward the striker 22 and the pawl slot 216 or to rotate about the first axis 150 in a first rotational direction or a clockwise direction from the perspective shown in FIG. 5. As such, the cinch plate 64 may be exert force on the striker 22 to inhibit undesirable noise or rattling and may also accommodate or adjust to the profile, size, and design tolerances of the striker 22 when the striker 22 is in the pawl slot 216. Such a biasing member may extend between the pawl 62 and the cinch plate 64.

Referring to FIGS. 3-5, the latch 66 may be rotatable about the second axis 170. The latch 66 may be rotatably disposed on the second pin 58 between the first mounting plate 52 and the second mounting plate 54. For instance, the latch 66 may be rotatably disposed on the second portion 182 of the second pin 58 and may be axially positioned between the first mounting plate 52 and the third portion 184 of the second pin 58. The latch 66 may be aligned with or may be disposed in a common plane with the pawl 62. In at least one configuration, the latch 66 may include a hole 270, first latch arm 272, and a second latch arm 274.

The hole 270 may be a through hole that may be disposed along the second axis 170. The hole 270 may receive the second pin 58.

The first latch arm 272 may extend away from the second axis 170 and may be configured to be engaged by the locking cam 68. The first latch arm 272 may include a notch 276 that may facilitate mounting of the second biasing member 72.

The second latch arm 274 may also extend away from the second axis 170. The second latch arm 274 may be disposed below the first latch arm 272 and may be disposed at an angle, such as an acute angle, with respect to the first latch arm 272. In at least one configuration, the second latch arm 274 may include an enlarged head 280 and a recess 282.

The enlarged head 280 may be disposed at a distal end of the second latch arm 274. The enlarged head 280 may have a set of latch teeth 284.

The set of latch teeth 284 may face away from the first latch arm 272. In addition, the set of latch teeth 284 may face toward and may be engageable with the set of pawl teeth 228. The set of pawl teeth 228 may have a greater number of teeth and the set of latch teeth 284, which may allow the set of latch teeth 284 to mesh with different pawl teeth to hold the pawl 62 in multiple positions, which in turn may allow the seat back 32 to be secured in multiple angular positions as will be discussed in more detail below.

The recess 282 may be disposed between the first latch arm 272 and the enlarged head 280. For example, the recess 282 may extend from the enlarged head 280 to the first latch arm 272. The recess 282 may extend toward the second axis 170 and may provide clearance that may facilitate rotation of the locking cam 68 as will be discussed in more detail below.

Referring to FIGS. 3-5, the locking cam 68 may be rotatable about the third axis 190. The locking cam 68 may be rotatably disposed on the third pin 60 between the first mounting plate 52 and the second mounting plate 54. For instance, the locking cam 68 may be rotatably disposed on the second portion 202 of the third pin 60 and may be axially positioned between the first mounting plate 52 and the third portion 204 of the third pin 60. The locking cam 68 may be aligned with or may be disposed in a common plane with the latch 66. In at least one configuration, the locking cam 68 may include a hole 290, first locking cam arm 292, and a second locking cam arm 294.

The hole 290 may be a through hole that may be disposed along the third axis 190. The hole 290 may receive the third pin 60.

The first locking cam arm 292 may extend away from the third axis 190 and may be configured to be engaged by the release handle 76.

The second locking cam arm 294 may also extend away from the third axis 190. The second locking cam arm 294 may be disposed below the first locking cam arm 292 and may be disposed at an angle, such as an obtuse angle, with respect to the first locking cam arm 292. In at least one configuration, the second locking cam arm 294 may include an enlarged head 280 and a recess 282 a first side surface 300, a second side surface 302, and an end surface 304.

The first side surface 300 may extend from the first locking cam arm 292 to the end surface 304. In addition, the first side surface 300 may face toward and may be engageable with the first latch arm 272 of the latch 66. More specifically, the first side surface 300 of the locking cam 68 may engage the first latch arm 272 and not the second latch arm 274 to rotate the latch 66 about the second axis 170 to disengage the set of latch teeth 284 from the set of pawl teeth 228. A notch 306 may be provided with the first side surface 300 to facilitate mounting of the third biasing member 74.

The second side surface 302 may be disposed opposite the first side surface 300. As such, the second side surface 302 may face away from the first locking cam arm 292.

The end surface 304 may be disposed at a distal end of the locking cam 68 and may extend from the first side surface 300 to the second side surface 302. The end surface 304 may be engageable with the first latch arm 272 of the latch 66 to hold the latch 66 in engagement with the pawl 62. More specifically, the end surface 304 may engage a side of the enlarged head 280 that is disposed opposite the set of latch teeth 284 to hold the set of latch teeth 284 in meshing engagement with the set of pawl teeth 228, thereby inhibiting rotation of the latch 66, which in turn inhibits rotation of the pawl 62. The end surface 304 may be radially disposed or disposed at a constant radial distance with respect to the third axis 190.

Referring to FIGS. 3-5, the first biasing member 70 may exert a biasing force on the pawl 62. For example, the first biasing member 70 may urge or bias the pawl 62 to rotate in a first rotational direction about the first axis 150 or in a clockwise direction from the perspective shown in FIG. 5. As such, the first biasing member 70 may bias the pawl 62 to rotate about the first axis 150 toward the bottom side of the pawl stop 118. The first biasing member 70 may have any suitable configuration. For instance, the first biasing member 70 may be configured as one or more springs. In at least one embodiment, the first biasing member 70 may have a first end and a second end. The first end may be received in the notch of the pawl 62. The second end may be disposed opposite the first end and may engage the first notch 138 of the second mounting plate 54. The first biasing member 70 may also extend around the first pin 56 and the first axis 150. Force exerted by the first biasing member 70 may urge the pawl 62 to rotate such that the open end 230 of the pawl slot 216 may be aligned with the open end 100 of the housing slot 90 and the open end 120 of the mounting plate slot 110 to be positioned to receive the striker 22.

Referring to FIGS. 3-5, the second biasing member 72 may exert a biasing force on the latch 66. For example, the second biasing member 72 may urge or bias the latch 66 to rotate in a second rotational direction about the second axis 170 or in a counterclockwise direction from the perspective shown in FIG. 5. As such, the second biasing member 72 may bias the latch 66 to rotate about the second axis 170 such that the set of latch teeth 284 are urged toward pawl 62 or toward the set of pawl teeth 228. The second biasing member 72 may have any suitable configuration. For instance, the second biasing member 72 may be configured as one or more springs. In at least one embodiment, the second biasing member 72 may have a first end and a second end. The first end may engage the first latch arm 272 and may be received in the notch 276. The second end may be disposed opposite the first end and may engage the second notch 140 of the second mounting plate 54. The second biasing member 72 may also extend around the second pin 58 and the second axis 170. Force exerted by the second biasing member 72 may help keep the set of latch teeth 284 in meshing engagement with the set of pawl teeth 228 when the striker 22 is received by the pawl 62.

Referring to FIGS. 3-5, the third biasing member 74 may exert a biasing force on the locking cam 68. For example, the third biasing member 74 may urge or bias the locking cam 68 to rotate in a first rotational direction about the third axis 190 or in a clockwise direction from the perspective shown in FIG. 5. As such, the third biasing member 74 may bias the locking cam 68 to rotate about the third axis 190 such that the locking cam 68 engages the enlarged head 280 to inhibit rotation of the latch 66 in a first direction about the second axis 170 when the set of latch teeth 284 are in meshing engagement with the set of pawl teeth 228. In addition, the biasing force exerted by the third biasing member 74 may be transmitted to the release handle 76 to rotate the release handle 76 about its rotational axis. The third biasing member 74 may have any suitable configuration. For instance, the third biasing member 74 may be configured as one or more springs. In at least one embodiment, the third biasing member 74 may have a first end and a second end. The first end may engage the second locking cam arm 294 and may be received in the notch 306. The second end may be disposed opposite the first end and may engage the third notch 142 of the second mounting plate 54. The third biasing member 74 may also extend around the third pin 60 and the third axis 190.

Referring to FIGS. 3-5, the release handle 76 may facilitate manual actuation of the latch mechanism 42. For example, the release handle 76 may be disposed proximate a top of the seat back 32 and may be configured to actuate the locking cam 68. In the configuration shown, the release handle 76 is received in the housing 50 between the first housing portion 80 and the second housing portion 82. It is also contemplated that the release handle 76 may be positioned outside the housing 50 or may be located remotely from the latch mechanism 42. In such configurations, the release handle 76 may indirectly actuate the locking cam 68, such as via a linkage such as a shaft or cable. The release handle 76 may be rotatable about a fourth axis 310. The fourth axis 310 may be disposed substantially parallel to the third axis 190 in one or more configurations. In at least one configuration, the release handle 76 may include a handle portion 320, a pivot 322, a first release handle arm 324, and a second release handle arm 326.

The handle portion 320 may be manually grasped or actuated to rotate the release handle 76 about the fourth axis 310. In at least one configuration, the handle portion 320 may be disposed above the locking cam 68 and may be disposed proximate the opening at the top of the housing 50.

The pivot 322 may facilitate mounting of the release handle 76 to the housing 50. For example, the pivot 322 may be rotatably mounted in the fourth housing hole 98 of the first housing portion 80 and second housing portion hole 108 of the second housing portion 82.

The first release handle arm 324 may extend away from the pivot 322 and the fourth axis 310 and may be engageable with the locking cam 68. For example, the first release handle arm 324 may be configured to engage the first locking cam arm 292 to rotate the locking cam 68 about the third axis 190. More specifically, the first release handle arm 324 may engage the first locking cam arm 292 and rotate the locking cam 68 in a second direction about the third axis 190 (e.g., a counterclockwise direction from the perspective shown in FIG. 5) when sufficient force is exerted on the release handle 76 to rotate the release handle 76 in a first direction about the fourth axis 310 (e.g., a clockwise direction from the perspective shown in FIG. 5) and overcome the biasing force of the third biasing member 74. As such, first release handle arm 324 may rotate the locking cam 68 about the third axis 190 and may cause the second locking cam arm 294 to slide across the enlarged head 280 of the latch 66 and move toward the first latch arm 272 and the recess 282.

The second release handle arm 326 may be spaced apart from the first release handle arm 324 and may also extend away from the pivot 322 and the fourth axis 310. The second release handle arm 326 may be configured to actuate a flag 330. For example, the second release handle arm 326 may extend the flag 330 out of the housing 50 to provide a visual indication that the latch mechanism 42 may not be secured to the striker 22.

Referring to FIG. 2, one or more strikers 22 may be fixedly mounted to the vehicle 12. For example, a striker 22 may be fixedly mounted to a vehicle body structure. Multiple strikers may be provided to accommodate a seat back 32 having a split configuration. For instance, a first striker may be mounted to a first lateral side of the vehicle body structure while a second striker may be mounted to a second lateral side of the vehicle body structure that may be disposed opposite the first side. Each striker 22 may be positioned near the top of the seat back 32 and may be aligned with a corresponding latch mechanism 42. The striker 22 may have any suitable configuration. For example, the striker 22 may be generally configured as a pin, shaft, or ring. A portion of the striker 22 that may be received by the latch mechanism 42 may extend along a striker axis that may extend generally parallel to the axis of rotation 40.

Referring to FIGS. 5-10, operation of the latch mechanism 42 will now be described in more detail starting with the latch mechanism 42 in the open condition.

Referring to FIG. 5, the latch mechanism 42 is shown in the open condition and is ready to receive the striker 22. For example, in FIG. 5, the seat back 32 may be in the process of being pivoted from a folded position toward the position shown in FIG. 1. The set of latch teeth 284 may not mesh with the set of pawl teeth 228 when in the open condition. For instance, the set of latch teeth 284 may rest on a portion of the perimeter of the pawl 62 that may be adjacent to the set of pawl teeth 228. The locking cam 68 may be disposed in the recess 282 of the latch 66. As such, the pawl 62 and latch 66 may be free to rotate in response to the latch mechanism 42 being moved into engagement with the striker 22.

Figure 6:
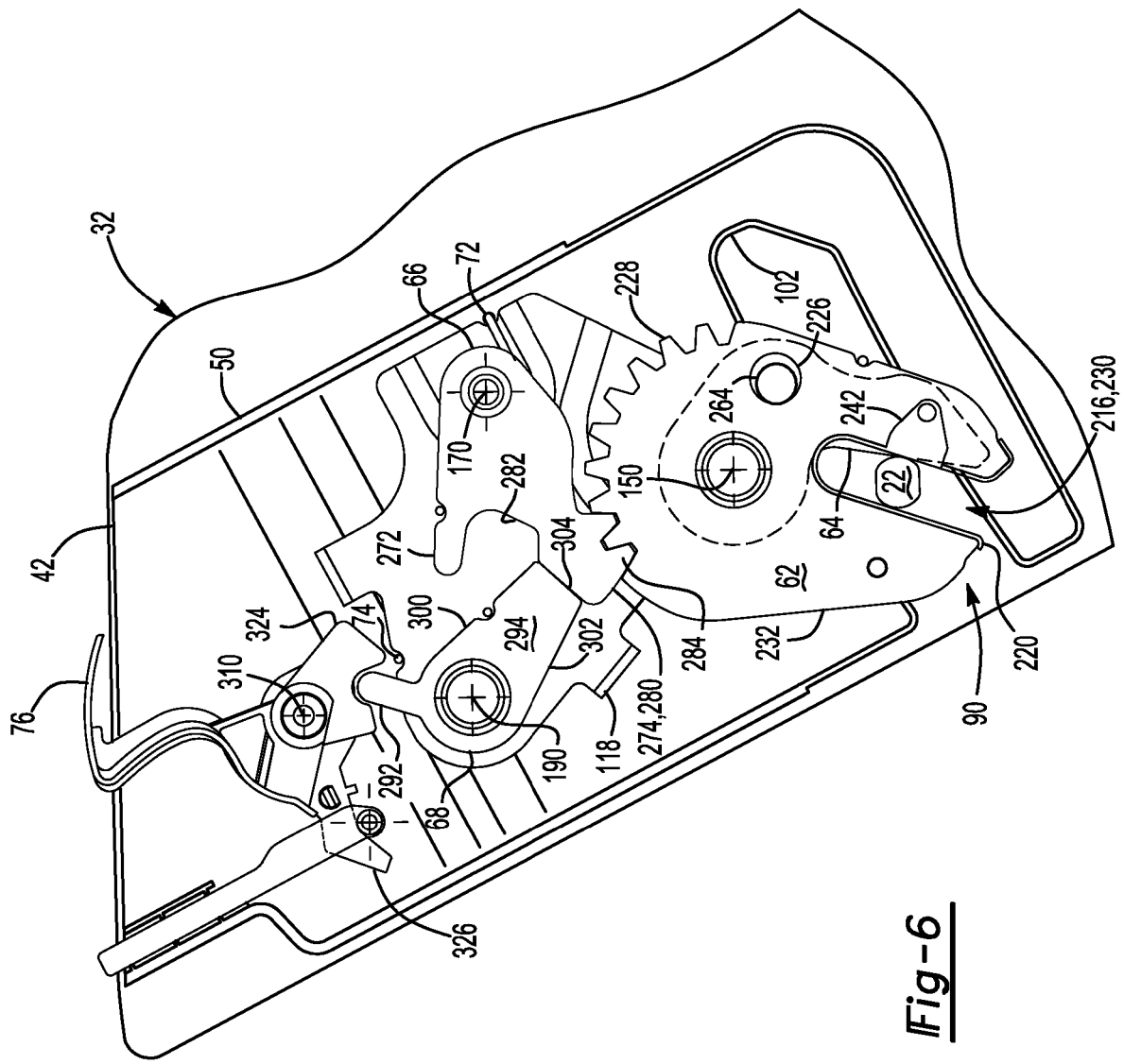
FIG. 6 is a side view of a portion of the latch mechanism in a latched condition with the striker received in a pawl and a latch in a locked position that inhibits rotation of the pawl.

Referring to FIG. 6, the latch mechanism 42 is shown after the seat back 32 has been reclined or pivoted about the axis of rotation 40 to receive the striker 22. The striker 22 may enter the latch mechanism 42 through the housing slot 90, mounting plate slot 110 and the pawl slot 216. The striker 22 may engage the pawl 62, the cinch plate 64, or both, and may cause the pawl 62 to rotate about the first axis 150 in a second direction or a counterclockwise direction from the perspective shown. Sufficient rotation of the pawl 62 may allow the set of latch teeth 284 to become aligned with the set of pawl teeth 228. The set of latch teeth 284 may then mesh with the set of pawl teeth 228 due to the biasing force of the second biasing member 72, provided that the release handle 76 is not being actuated and is free to rotate about the fourth axis 310. The locking cam 68 may rotate in the first direction about the third axis 190 due to the biasing force of the third biasing member 74 such that the end surface 304 of the locking cam 68 may engage the enlarged head 280 to hold the latch 66 in meshing engagement with the pawl 62. The angular position of the seat back 32 shown in FIG. 6 may be referred to as a first angular position.

Figure 7:
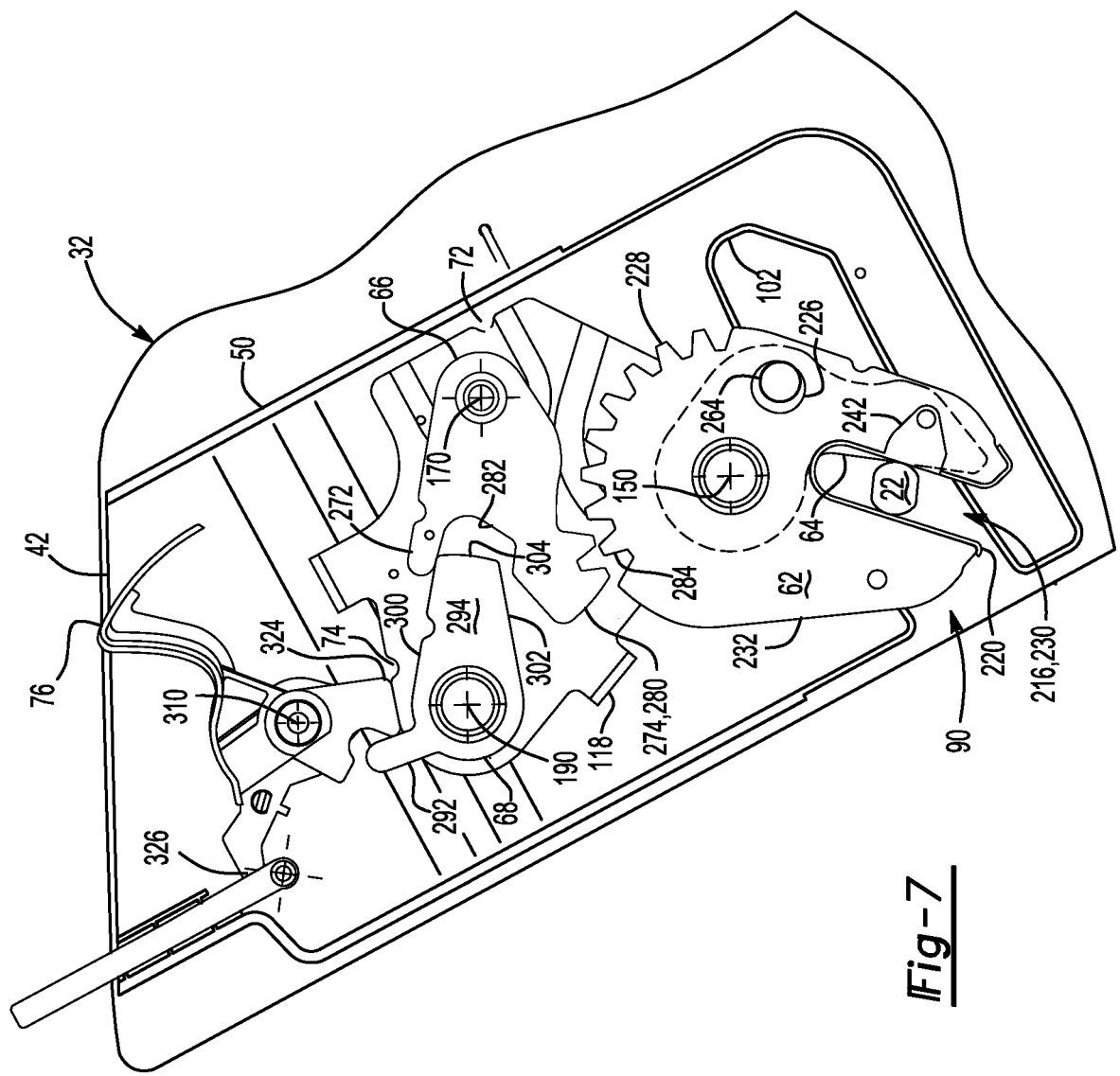
FIG. 7 is a side view of a portion of the latch mechanism with a latch actuated to an unlocked position that permits rotation of the pawl.

Referring to FIG. 7, the latch mechanism 42 is shown after the release handle 76 is actuated with respect to FIG. 6. Force exerted on the release handle 76 may rotate the release handle 76 about the fourth axis 310 in the first direction or a clockwise direction from the perspective shown. In response, the release handle 76 may rotate the locking cam 68 about the third axis 190 in the second direction or counterclockwise from the perspective shown. The locking cam 68 may exert force on the first latch arm 272 of the latch 66 and may rotate the latch 66 in the first direction or clockwise about the second axis 170 from the perspective shown to disengage the set of latch teeth 284 from the set of pawl teeth 228. The seat back 32 may then be free to be rotated about the axis of rotation 40 to a different angular position.

Figure 8:
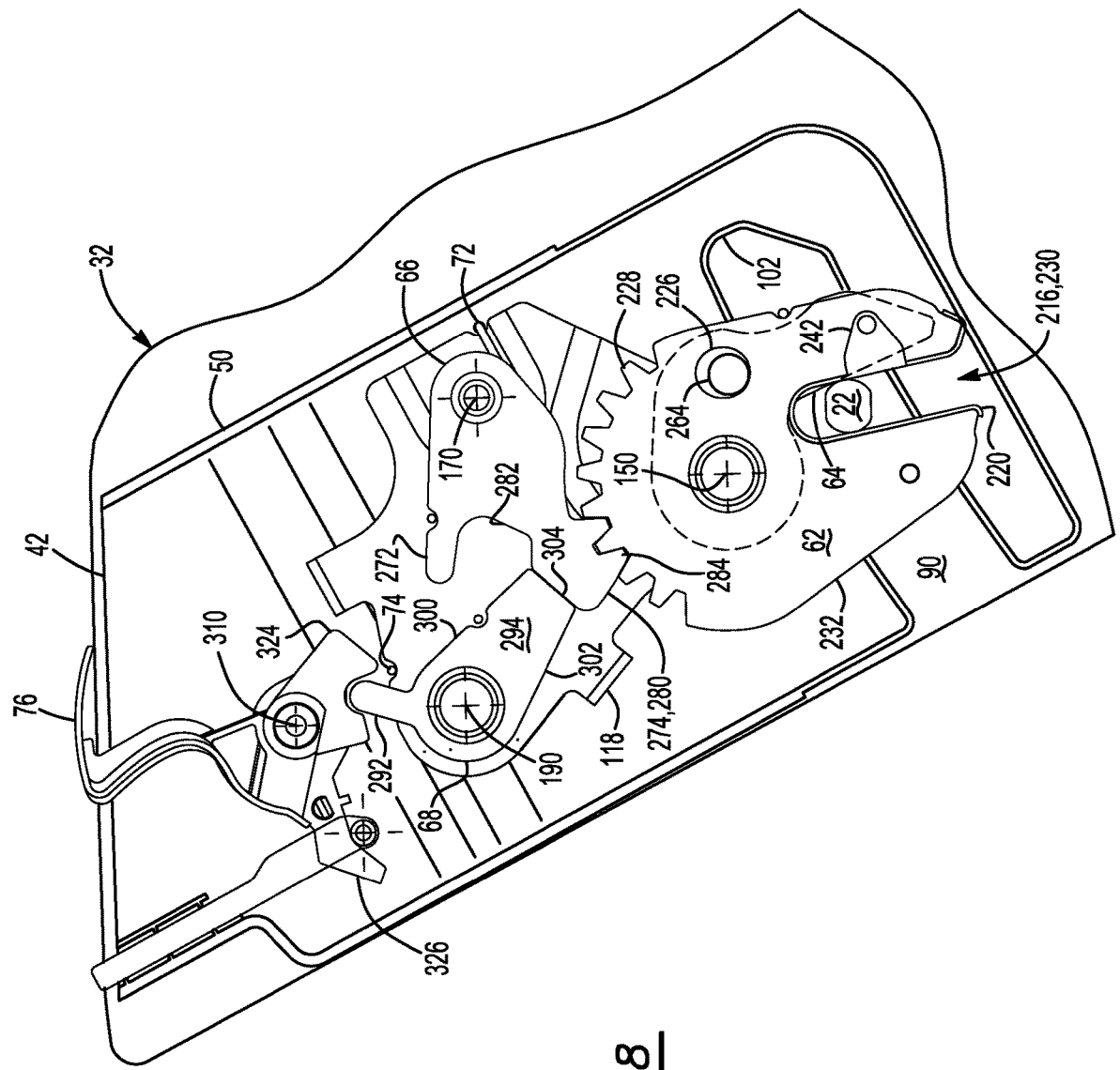
FIGS. 8-10 are side views of a portion of the latch mechanism with the seat back rotated to other angular positions and the latch in the locked position.
Figure 9:
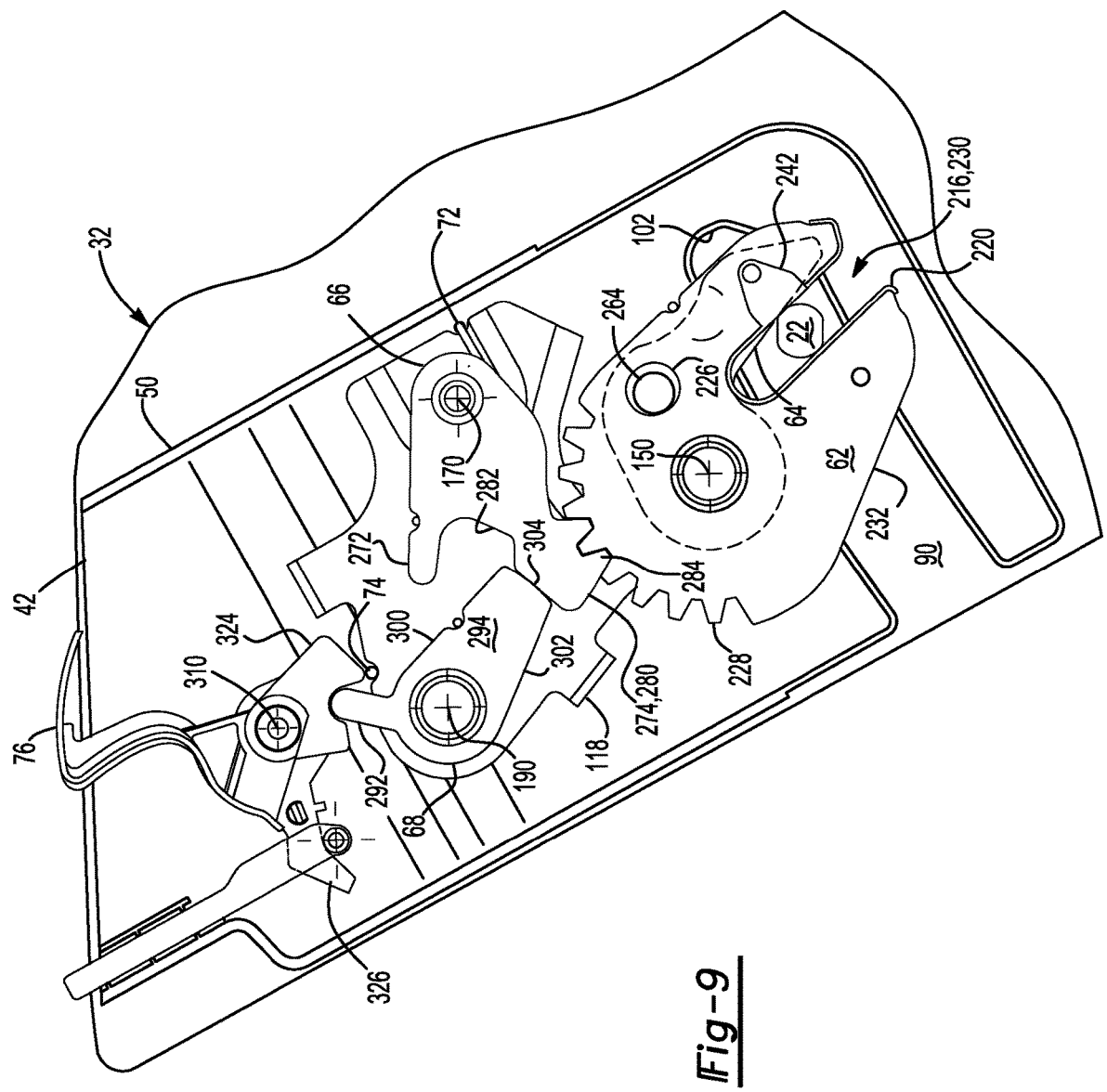
Figure 10:
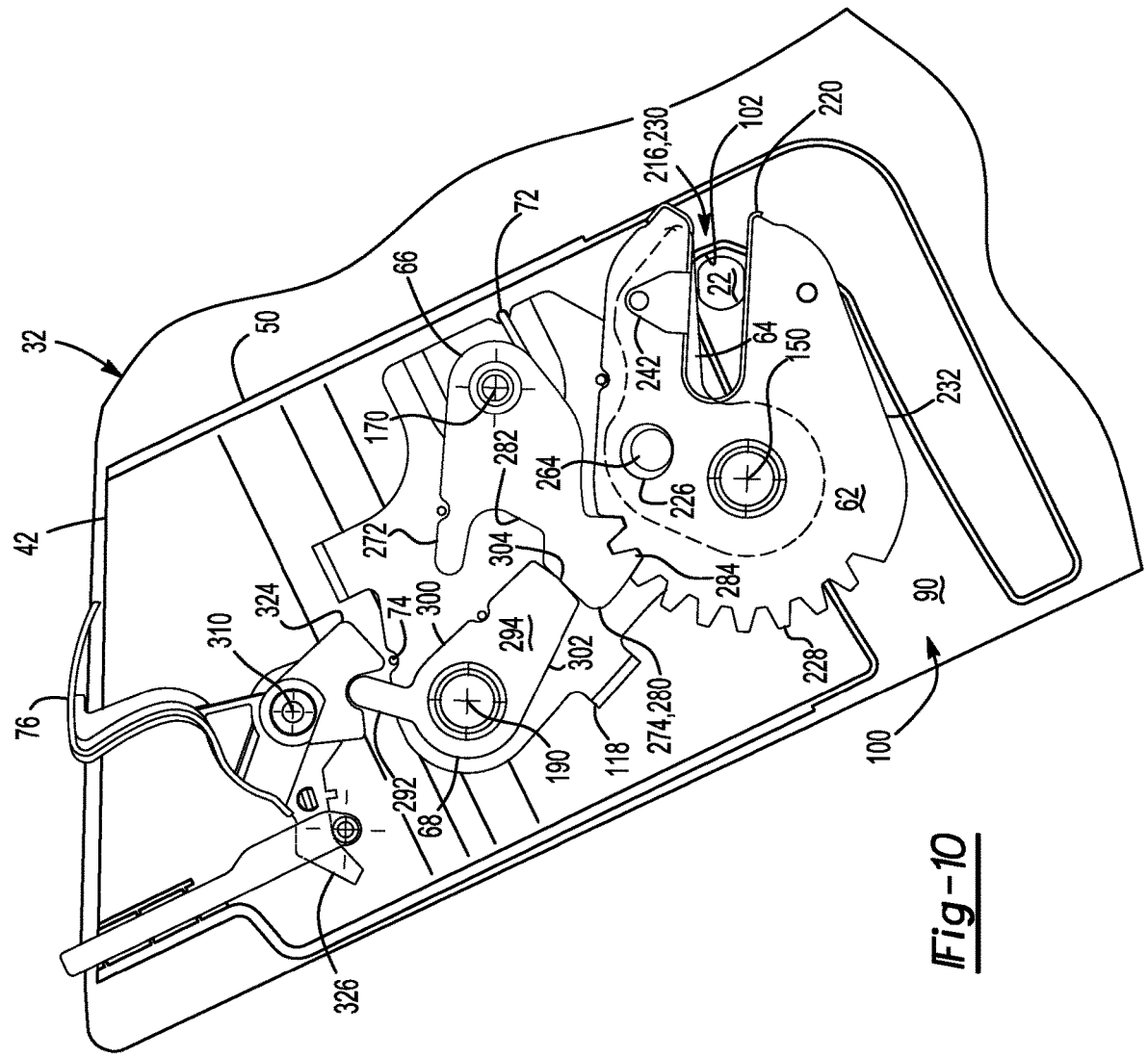

Referring to FIGS. 8-10, the latch mechanism 42 may allow the seat back 32 to be secured to the striker 22 in multiple angular positions when the striker 22 is received in the housing slot 90, the mounting plate slot 110, and the pawl slot 216. In FIGS. 8-10, the seat back 32 is shown in additional angular positions in which the seat back 32 is further reclined with respect to the angular position shown in FIGS. 6 and 7. In each of FIGS. 8-10, the set of latch teeth 284 is shown in meshing engagement with different members of the set of pawl teeth 228; however, it is to be understood that the angular positions shown in FIGS. 8-10 are not the only possible angular positions for the seat back 32. For example, the seat back 32 may be secured in an angular position between the position shown in FIG. 7 and the position shown in FIG. 8 by having the set of latch teeth 284 receive the second pawl tooth 228 from the left. Similarly, the seat back 32 may be secured in an angular position between the position shown in FIG. 8 and FIG. 9 by meshing engagement with the fourth pawl tooth 228 and so on. The end surface 304 of the locking cam 68 may engage the enlarged head 280 to hold the latch 66 in meshing engagement with the pawl 62 in these angular positions. The release handle 76 may be pulled to disengage the set of latch teeth 284 from the set of pawl teeth 228 to permit rotational movement from the depicted positions to other angular positions as described with respect to FIG. 6. In addition, it is to be understood that the latch mechanism 42 does not need to be sequentially secured in each possible angular position to recline or otherwise change the angular position of the seat back 32. Instead, the release handle 76 may continue to be actuated and the seat back 32 may be moved directly to a desired angular position and then released to allow the latch teeth 284 to mesh with the set of pawl teeth 228 and secure the angular position of the seat back 32.

The striker 22 may be positioned closer to the closed end 102 of the housing slot 90, the closed end 122 of the mounting plate slot 110, or both as the seat back 32 is reclined or pivoted further away from the seat bottom 30. For example, the striker 22 is disposed closer to the closed end in FIG. 8 as compared to FIG. 6, closer to the closed end in FIG. 9 as compared to FIG. 8 and so on. As such, the open end 230 of the pawl slot 216 may rotate toward the closed end 102 of the housing slot 90 and the closed end 122 of the mounting plate slot 110 as the seat back 32 is reclined.

The angular position of the seat back 32 shown in FIG. 10 may be referred to as a last angular position. In FIG. 10, the open end 230 of the pawl slot 216 faces toward the closed end 102 of the housing slot 90. As such, the open end 230 may face toward the closed end 102 when the seat back 32 is in the last angular position. The angular positions between the first angular position and the last angular position may be referred to as intermediate positions, examples of which are shown in FIGS. 8 and 9. The striker 22 may be disposed closer to the first axis 150 when in an intermediate position such as is shown in FIGS. 8 and 9 than when in the first angular position shown in FIG. 6, the last angular position shown in FIG. 10, or both.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A seat arrangement comprising:
 a striker that is fixedly disposed on a vehicle;
 a seat back that is pivotable about an axis of rotation; and
 a latch mechanism disposed on the seat back, the latch mechanism including:
  a pawl that is rotatable about a first axis and that has a pawl slot;
  a reinforcement insert that is received in the pawl slot, wherein the reinforcement insert has a U-shaped configuration that extends an entire length of the pawl slot; and
  a cinch plate that is rotatable about the first axis with respect to the pawl and disposed adjacent to the pawl;
 wherein the striker is disposed between the pawl and the cinch plate when the striker is received in the pawl slot.

2. The seat arrangement of claim 1 wherein the latch mechanism is disposed proximate a top of the seat back.

3. The seat arrangement of claim 1 wherein the pawl and the cinch plate contact the striker when the striker is received in the pawl slot.

4. The seat arrangement of claim 1 wherein the cinch plate has a cinch pin that extends from the cinch plate and the pawl has a cinch pin receiving hole that receives a cinch pin, wherein the cinch pin receiving hole is larger than the cinch pin to permit limited rotation of the cinch plate with respect to the pawl.

5. The seat arrangement of claim 4 wherein the pawl stops rotation of the cinch plate about the first axis when the cinch pin engages the pawl in the cinch pin receiving hole.

6. The seat arrangement of claim 1 wherein the reinforcement insert has a first flange that is disposed on a first side of the pawl and a second flange that is disposed on a second side of the pawl.

7. The seat arrangement of claim 1 wherein the reinforcement insert has a first flange that is disposed on a first side of the pawl, a second flange that is disposed on a second side of the pawl that is disposed opposite the first side, a first flange pin that extends from the first flange into a first flange pin receiving hole of the pawl and a second flange pin that extends from the second flange into a second flange pin receiving hole of the pawl.

8. A seat arrangement comprising:
 a striker that is fixedly disposed on a vehicle;
 a seat back that is pivotable about an axis of rotation with respect to the striker; and
 a latch mechanism disposed proximate a top of the seat back, the latch mechanism including:
  a pawl that is rotatable about a first axis, the pawl having a set of pawl teeth and a pawl slot disposed opposite the set of pawl teeth;
  a latch that is rotatable about a second axis, the latch having a first latch arm that extends away from the second axis and a second latch arm that extends away from the second axis, the second latch arm having an enlarged head that is disposed at a distal end of the second latch arm and that has a set of latch teeth that are engageable with the set of pawl teeth, and a recess that extends from the enlarged head to the first latch arm; and
  a locking cam that is rotatable about a third axis, wherein the locking cam engages the enlarged head to hold the set of latch teeth in meshing engagement with the set of pawl teeth to inhibit rotation of the pawl and the latch.

9. The seat arrangement of claim 8 wherein the set of latch teeth faces away from the first latch arm.

10. The seat arrangement of claim 8 wherein the set of pawl teeth has a greater number of teeth than the set of latch teeth.

11. The seat arrangement of claim 8 wherein the locking cam engages the first latch arm but not the second latch arm to rotate the latch about the second axis to disengage the set of latch teeth from the set of pawl teeth.

12. The seat arrangement of claim 8 wherein the locking cam has first locking cam arm that has a first side surface, a second side surface, and an end surface that extends from the first side surface to the second side surface, wherein the end surface is engageable with the enlarged head and the first side surface is engageable with the first latch arm.

13. The seat arrangement of claim 12 wherein the locking cam has a second locking cam arm and latch mechanism further comprises a release handle that is rotatable about a fourth axis, wherein the release handle engages the second locking cam arm to rotate the locking cam about the third axis away from the enlarged head and toward the first latch arm.

14. The seat arrangement of claim 13 further comprising a first biasing member that extends around the first axis and that biases the pawl in a first rotational direction about the first axis.

15. The seat arrangement of claim 14 further comprising a second biasing member that extends around the second axis and engages the first latch arm, wherein the second biasing member biases the latch to rotate in a second rotational direction about the second axis.

16. The seat arrangement of claim 15 further comprising a third biasing member that extends around the third axis and engages the first locking cam arm, wherein the third biasing member biases the locking cam to rotate in the first rotational direction about the third axis.

17. A seat arrangement comprising:
 a striker that is fixedly disposed on a vehicle;
 a seat back that is pivotable about an axis of rotation with respect to the striker; and
 a latch mechanism disposed proximate a top the seat back, the latch mechanism including:
  a first mounting plate having a mounting plate slot having a closed end;
  a second mounting plate;
  a housing that is fixedly positioned with respect to the first mounting plate and the second mounting plate, the housing having a housing slot that is aligned with the mounting plate slot, the housing slot having a closed end;
  a pawl that is rotatably mounted between the first mounting plate and the second mounting plate, the pawl having a set of pawl teeth and a pawl slot; and
  a latch that is rotatably mounted between the first mounting plate and the second mounting plate, the latch having a set of latch teeth that are engageable with the set of pawl teeth to inhibit rotation of the pawl;
 wherein the latch mechanism allows the seat back to be secured to the striker in multiple angular positions when the striker is received in the mounting plate slot, the housing slot, and the pawl slot.

18. The seat arrangement of claim 17 wherein the striker is positioned closer to the closed end of the mounting plate slot and the closed end of the housing slot as the seat back is pivoted further away from a seat bottom.

19. The seat arrangement of claim 17 wherein the pawl is rotatable about a first axis and the seat back is securable in a first angular position, a last angular position, and at least one intermediate position disposed between the first angular position and the last angular position, wherein the striker is disposed closer to the first axis when in the intermediate position than when in the first angular position and the last angular position.

20. The seat arrangement of claim 19 wherein the pawl slot has an open end that faces toward the closed end of the housing slot when the seat back is in the last angular position.

\* \* \* \* \*